United States Patent [19]

Hagin et al.

[11] Patent Number: 4,875,557
[45] Date of Patent: Oct. 24, 1989

[54] BRAKE PLAY RESETTING DEVICE

[75] Inventors: Faust Hagin; Hans Drewitz; Manfred Krenner, all of Munich, Fed. Rep. of Germany

[73] Assignee: MAN Nutzfahrzeuge GmbH, Munich, Fed. Rep. of Germany

[21] Appl. No.: 285,197

[22] Filed: Dec. 15, 1988

[30] Foreign Application Priority Data

Dec. 19, 1987 [DE] Fed. Rep. of Germany ....... 3743206

[51] Int. Cl.$^4$ ............................................. F16D 65/56
[52] U.S. Cl. ........................... 188/79.55; 188/196 BA
[58] Field of Search .......... 188/79.55, 196 B, 196 BA, 188/196 D

[56] References Cited

U.S. PATENT DOCUMENTS

| 4,380,276 | 4/1983 | Sweet et al. | 188/79.55 |
| 4,420,268 | 4/1984 | Karlsson | 188/79.55 |
| 4,484,665 | 11/1984 | Svensson | 188/79.55 |

FOREIGN PATENT DOCUMENTS 2364214  7/1975  Fed. Rep. of Germany .

Primary Examiner—Duane A. Reger
Attorney, Agent, or Firm—Roberts, Spiecens & Cohen

[57] ABSTRACT

A device for automatically resetting the play between a brake lining and a rotating brake member which is to be braked. The device is able to take into account an increase in the play due to wear as well as a decrease in the play due to overadjustment due to internal elasticity and heating, during each braking operation by suitably dimensioned positive and negative resetting. The device employs a setting member which is rotatable in a housing and with which a coupling can be engaged to drive a setting shaft and thereby take up play during braking. As the braking force increases, the coupling is locked against rotation and as the setting shaft undergoes further displacement, the play is slightly increased.

16 Claims, 3 Drawing Sheets

BRAKE PLAY RESETTING DEVICE

BACKGROUND OF THE INVENTION

1. Field of the Invention

The invention relates to a device for automatically resetting the play between a brake lining and a rotary brake member associated with a wheel to be braked.

More specifically the invention relates to such a brake play resetting device comprising an adjusting member which during braking is adapted to move out of an initial position and to return thereto when the braking force is discontinued and which during braking under the action of a pressure cylinder actuator produces braking contact between the brake lining and said member to be braked, and is provided with a member, forming part of a unidirectional coupling means, which is adapted to pivot in relation to the adjusting member on contact with an abutment, said coupling being adapted to turn a setting shaft (which is causes adjustment by spiral flanks and transmits the braking force) when a rated play amount between the parts to be braked is exceeded, in a direction effective to produce a reset effect to reduce said play, and with an axial compression spring between the setting shaft and the adjustment means, and which, when during braking a certain braking force is exceeded, yields and enables an axial displacement of the setting shaft to take place between two abutments on said adjustment means and in so doing causes disengagement between the setting shaft and the pivoting member by means of a coupling member equipped with a conical surface, said coupling member having oblique flanks cooperating with oblique flanks of the setting shaft in order to maintain the unidirectional coupling function of the pivoting member.

2. Description of Prior Art

Such a device is described in the German patent No. 2,443,003 although here the system is limited to linkage setting members and does not have any wide definition envisaging other types of devices for enabling play resetting to take place. The present invention is however not limited to linkage adjustment means. However, in the following description the problem addressed by the invention is explained in the context of a conventional linkage setting member.

Thus for instance the German pre-examination specification No. 2,008,139 describes a linkage adjustment means enabling the additional play, due to wear, between a brake drum and brake shoes to be taken up in steps or continuously by resetting leading to a reduction thereof.

Linkage adjustment means have also be proposed, see the U.S. Pat. No. 3,351,163 or, respectively, the German examined specification 1,480,038, which when a certain braking force has been exceeded, override a readjustment function so that an excessive reset is precluded.

However, not one of these prior art references discloses a device capable of taking into account the effects of brake parts which have been heated by repeated vigorous braking and thus avoid excessive reset caused thereby. Such excessive reset may in extreme cases lead to seizing of the brake members.

SUMMARY OF THE INVENTION.

Accordingly one object of the present invention is to so improve upon a device of the initially specified type so that it able to perform a resetting and setting of the play and to prolong exaggerated reset when there is a repeated vigorous and possibly extended braking action leading to substantial heating of the brake members.

A further object of the invention is to provide such a system which always leads to the setting of the appropriate play.

In order to achieve these and/or other objects appearing from the present specification and claims the invention provides a means adapted to preclude turning of the coupling member during a part of the axial movements, taking place between the abutments, of the setting shaft and thus causes a relative slip of the oblique flanks of the setting shaft and the captured coupling member and thus further causes a small increase in the play between the brake lining and the brake member to be braked.

The invention will be described in greater detail with reference to a linkage adjustment means illustrated in the accompanying drawings.

BRIEF DESCRIPTION OF THE SEVERAL FIGURES OF THE DRAWINGS.

FIG. 1 diagrammatically shows the association between the linkage adjustment means, the linkage and the brake cylinder, FIG. 2 shows the bearing means of the linkage adjustment means in accordance with FIG. 1.

Figure 1:
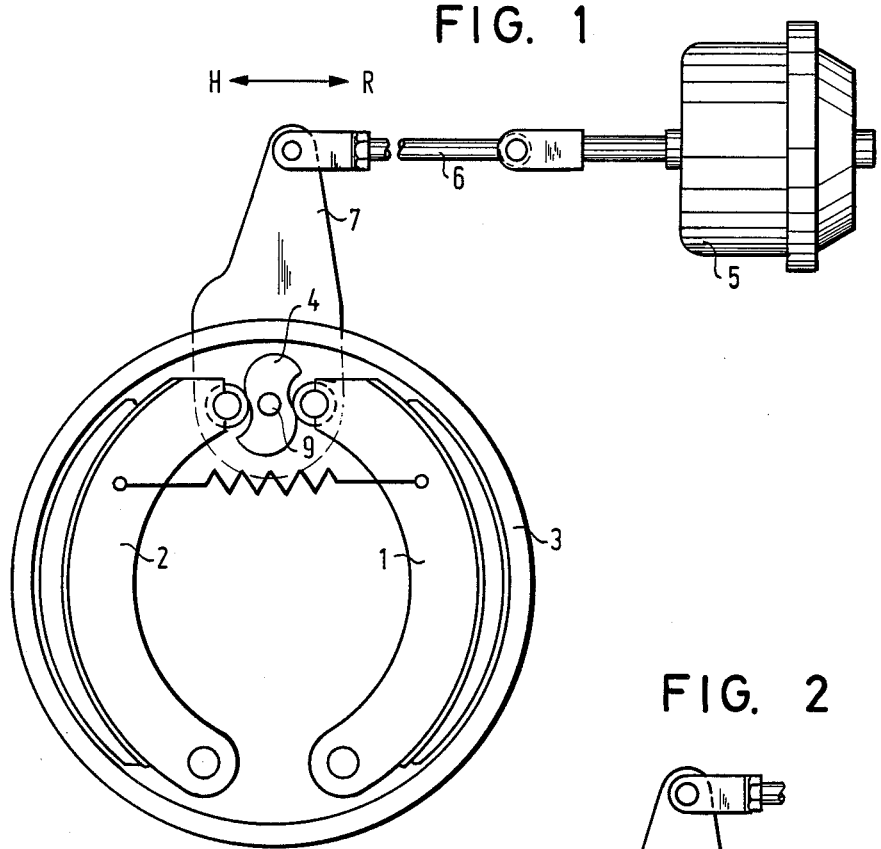
Figure 2:
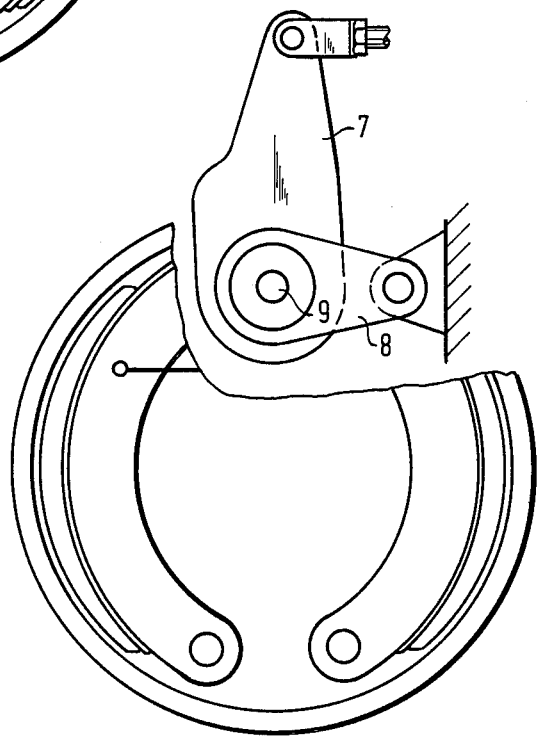

DETAILED DESCRIPTION OF A WORKING EMBODIMENT OF THE INVENTION.

The linkage adjustment means 7 is pivotally mounted in a holder 8 secured to the chassis of a vehicle and forms the correction between an operating cam 4, actuating the brake shoes 1 and 2 within a brake drum 3, and a linkage 6 to be operated by means of a brake cylinder 5.

The operating cam 4 is fixedly mounted on a cam shaft 9 which is arranged so as to be coaxial to the pivot axis and shaft 9 has a worm wheel 11 keyed thereon within the housing 10 of the linkage adjustment means 7. A worm 13 of a worm shaft 14 is in mesh with the teeth 12 of the worm wheel 11. The worm shaft 14 is mounted in the housing 10 and rotatably is supported in a receiving hole 15 with hole sections 15/1, 15/2, 15/3 and 15/4 so that it may shift axially between two abutment faces 16 and 17 which are fixed in relation to the housing. Associated abutment faces on the worm shaft 14 are disposed on either side of a section 14/1 containing the worm 13 by the end faces 18 and 19 of the worm. The worm shaft 14 is supported by means of its shaft section 14/2 in the hole section 15/1. In this hole there is furthermore a compression spring 20, in the form, for instance, of disk springs, set to a given holding force. The spring 20 is mounted on a pin 23 which is coaxially located by means of a central blind hole 21 in the worm shaft 14 and a point bearing 22 secured to the housing. The spring 20 is held axially by means of a collar 24 on the pin 23 and bears at its other end against the end face 25 of the worm shaft 14 so that the latter is held pressed in the normal setting against the abutment face 16 and a spacing denoted S3 is maintained between the surfaces 17 and 19. The hole section 15/3 receiving the shaft section 14/3 of the worm shaft 14 is formed a in coupling bushing 26, which is located axially and radially in fixed manner in the hole section 15/4, for example a press fit or by shrinkage, and furthermore it has the abutment face 16. This coupling bushing 26 has, opposite the abutment face 16, a peripheral terminal groove 27 with an external coupling surface 28 and forms the fixed side of the coupling for a double conical coupling ring 30 which in the normal setting has its corresponding conical face 29 spaced therefrom by the small axial play S2. In the normal position shown in FIG. 3, the double conical coupling ring 30, forming the coupling member, is so placed that its second conical coupling face 31 rests on a suitably adapted conical coupling surface 32 of a setting or drive ring 33, which forms part of a unidirectional coupling. The thrust force is supplied by an axial compression spring 34, which is centered by a pin on the coupling bushing 26 and at one end bears on a shoulder of the bushing 26 and at its other end bears on a shoulder of the double cone coupling ring 30. The ring 30 mounted with minimum axial play by way of its central through hole, is provided with a fast pitch thread 35, engaged on a fast pitch thread 36 which is formed in a collar of the shaft section 14/4 of the worm shaft 14. Such fast pitch thread 36 is not selflocking. The ring 30 may be shifted by means of the cooperating oblique flanks of threads 35, 36. Bearing against the end face 37 of thread 36, adjacent to the front side of the collar, is a drive ring 38, there being an axial play S1 between an associated abutment face 39 of the ring 38 and the facing front end face 40 of the double cone ring 30, when the latter is in the normal setting. The thrust acting on the drive ring 38 for this purpose is supplied by an axial thrust spring 41 whose thrust force is less than that of the compression spring 34 and which, supported on the shaft section 14/4 of the worm shaft 14, bears at one end on the drive ring 38, that is to say here at the end face opposite the end face 40, and at the other end it bears internally on the bottom of a bell-like setting sleeve 42. This setting sleeve 42 is arranged in the interior of the setting ring 33 without however making contact with it and is supported on the shaft section 14/4 of the worm shaft 14 and is held in place by a locking ring 43 fitted into a groove in the shaft 14. In the normal position of the double conical coupling ring 30 there is axial play S4 between the front end face 40 of the ring 30 and the facing inner end face 44 of the setting sleeve 42. The function of the setting sleeve 42 will be explained in more detail below. The outer end, which projects from the housing 7, of the shaft section 14/4 of the worm shaft 14, bears a setting head 45 in the form of a hex head or the like to which a tool may be applied for manual adjustment. The setting ring 33 is arranged in the same hole section 15/4 as the coupling ring 26, but however is only retained in the axial direction in the housing 10 by such means so as to allow turning. In the case illustrated balls are provided as such means, which on fitting the setting ring 33, after insertion of the latter in the hole section 15/3, are introduced through a fitting passage (not shown) into a circular groove of which one half is formed in the setting ring 33 and one half is formed in the housing 10. Alternatively it would be possible to have a rotatable but axially locking means for locating the setting ring 33 or to have bayonet locking means. The interior of the housing 10 is sealed off from the outside by sealing rings 47 and 48 between the setting ring 33 and the housing 10 and between the setting ring 33 and the shaft section 14/4 of the worm shaft 14. The setting ring 33 furthermore possesses, as will be readily seen from FIG. 4, a cutout 50, which outside the housing 10 fits around a stationary abutment, which in the present case is formed by a pin 49. A mouth is defined between two parallel inner surfaces 51 and 52 of fixed entraining fingers 53 and 54 of ring 33. The clearance K between the circumferential surface of the pin 49 and one of the inner surfaces when the pin bears against the opposite inner face is so chosen that on swinging the linkage adjustment means 7 between the two inner faces 51 and 52 defining the mouth 50 it is possible for an angular movement to take place, which corresponds to the normal play between the brake shoes 1 and 2 and the brake drum 3. Furthermore an abutment 55 is provided externally on the housing 10 and it is against this abutment 55 that the setting ring 33, which is pressed by way of an abutment arranged on the drive finger 54, under the action of a return spring 57 which is suitably tensioned, is held with its mouth 50 in the normal position or may be returned thereinto. The return spring 57 bears at one end on an arm 58 carrying the abutment 56 and at the other end on a holder 59 arranged externally on the housing 10.

The linkage adjustment means 7 with this design has a function which owing to its complexity will be described in full detail in separate steps.

Figure 3:
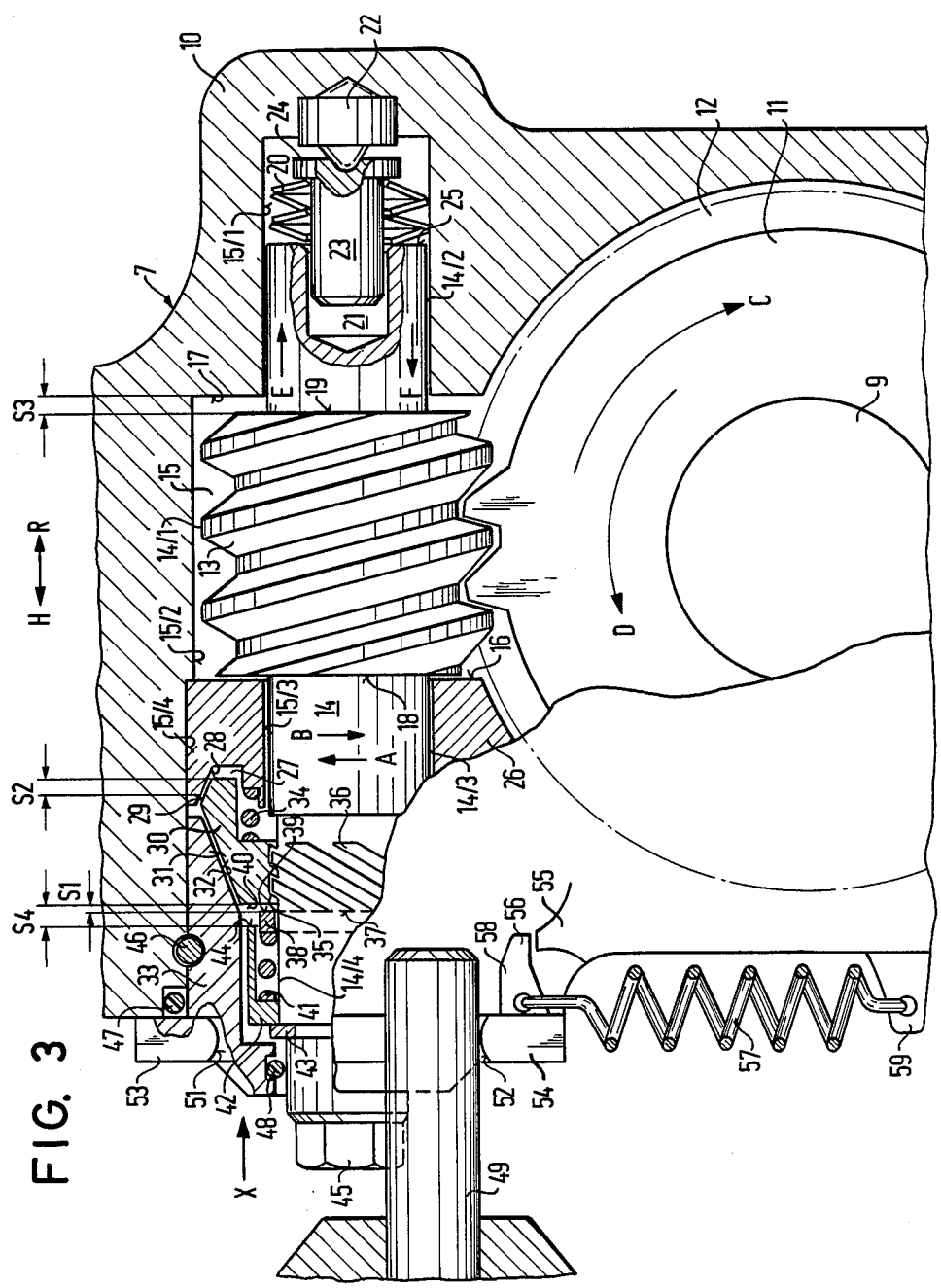
FIG. 3 shows the linkage adjustment means partially in section and partially in elevation.
Figure 4:
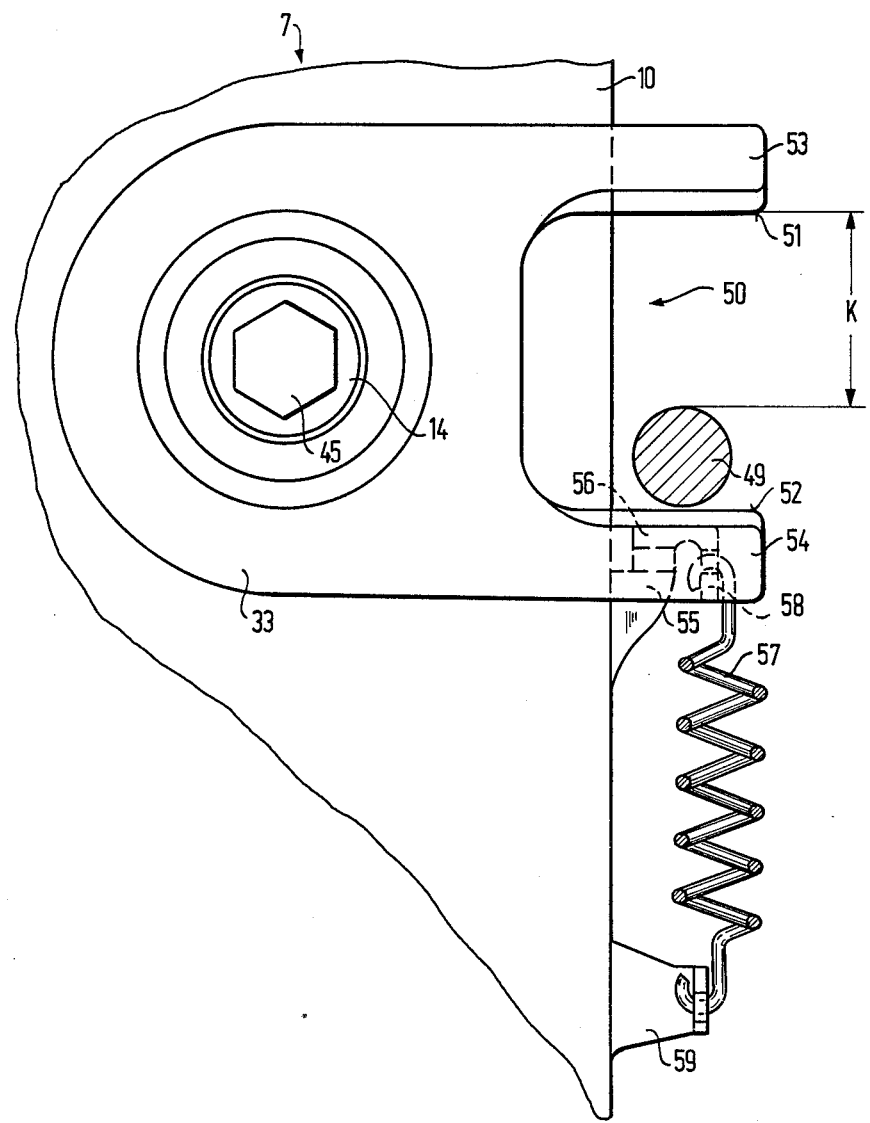
FIG. 4 is a view of part of the linkage adjustment means looking in the direction of arrow x in FIG. 3.

Let it be assumed that initially the brake cylinder 5 is not actuated so that the linkage 6, the linkage adjustment means 7, the operating cam 4 and the brake shoes 1 and 2 are in their respective normal positions in relation to the brake drum 3. Within the linkage adjustment means 7 the individual parts thereof will be in the position as indicated in FIGS. 3 and 4. The double conical coupling ring 30 is disengaged from the coupling ring 26 and is in coupled engagement with the setting ring 33. The axial play S1, S2, S3 and S4 is in each case at the maximum value.

If the pressure actuator cylinder 5 is operated for a braking operation, the linkage adjustment means 7 is pivoted in the direction of the arrow H by the linkage 6 about its bearing means in the holder 8. The following effects result from this action:

Phase (a)

There is pivoting of the linkage adjustment means 7 without any change in its internal condition and there is only a simultaneous pivoting of the outer mouth 50 of the setting ring 33 out of engagement with the inner face 52 until the upper inner face 51 of the mouth 50 engages the abutment pin 49. The angular displacement performed is equal to the rated value for the motion to take up the normal play between the brake shoes 1 and 2 and the brake drum 3 by a corresponding turning of the cam 4.

Phase (b)

With an increase in play between the brake shoes 1 and 2 and the brake drum 3 the turning of the linkage adjustment means 7 is continued in the direction of the arrow H. As this happens owing to the abutment pin 49 engaging the inner face 51 of the mouth there is a turning of the setting ring 33 in a counterclockwise direction (referring to FIG. 4) and against the force of the return spring 57. The axial position of the parts 38, 30 and 14 within the linkage adjustment means 7 with the amounts of play S1, S2, S3 and S4 remains the same. Only the single direction coupling function of the double conical coupling ring 30 becomes effective owing to the turning of the setting ring 33 caused by the direction of the helix angle of the engaging threads 35 and 36, the result being motion tending to disengage the coupling faces 31 and 32, the latter however remaining in contact and riding on each other owing to the thrust of the compression spring 34. At the end of this phase the brake shoes 1 and 2 are moved by the cam 4 into contact with the brake drum 3.

Phase (c)

After engagement of the brake shoes 1 and 2 with the brake drum and after further pivoting of the linkage adjustment means 7 there is, owing to the braking force applied, a reaction torque at the cam shaft 9, and such torque acts via the worm wheel 11 to produce an axial displacement of the worm shaft 14, against the force of the compression spring 20, away from the abutment face 16, which is fixed in relation to the housing, in the direction of the arrow E (FIG. 3) towards the abutment face 17. The distance S3 is thus reduced. At the same time the distance S1 is reduced to zero, for the drive ring 38 is caused to perform a following motion by the compression spring 41, and, after a corresponding take up of play at the engaging threads 35 and 36, is brought into engagement with the end face 40 of the double conical coupling ring 30.

Phase (d)

During the course of further axial motion of the worm shaft 14 in the same direction, due to the elasticity of the braking parts, the double cone coupling ring 30 is axially entrained via by means of the engaging threads 35 and 36 and disengaged from the setting ring 33 and brought into coupling engagement with the stationary coupling bushing 26.

Phase (e)

With a further increase of the axial force acting on the worm shaft 14, caused by an increment in the braking force and further pivoting of the linkage adjustment means 7, the worm shaft 14 is further displaced towards the abutment face 17, this being accompanied by a reduction in the distance S3. Owing to the double conical coupling ring 30 held fast in the coupling bushing 26 the engaging threads 35 and 35 cause a rotation of the worm shaft 14 in the direction of the arrow A (FIG. 3), that is to say corresponding to a slight increase in the play between the brake drum 3 and the brake shoes 1 and 2, there being a rotation of the worm wheel 11 in the direction of the arrow C (FIG. 3).

At the end of this phase the distance S3 is equal to zero, that is to say, the abutment face 19 of the worm shaft 14 comes into engagement with the abutment face 17 on the housing. Thus, all the participating axially movable parts 38, 30 and 14 will have reached the end of their travel and are not longer able to be moved in the same direction.

Phase (f)

The linkage adjustment means is further pivoted until the desired braking force is reached. Then owing to the engagement of the upper inner face 51 of the mouth resting on the abutment pin 49, the setting ring 33 is turned further. When the desired braking force has been applied, all the parts of the linkage adjustment means 7 will have reached their terminal set positions. If now the braking force is discontinued, there will be an opposite motion of the linkage adjustment means 7 in the direction of the arrow R (FIG. 3). The separate events taking place will be as follows:

Phase (g)

Firstly owing to the return motion of the linkage adjustment means 7 the setting ring 33 will be turned back under the effect of the return spring 57.

Phase (h)

Then the spring 20 starts to move the worm shaft 14 out of its previous abutting position in the direction of the arrow F (FIG. 3) into the initial setting towards the abutment face 16. The double conical coupling ring 30 then remains just in coupling contact with the coupling bushing 26.

Phase (i)

On further axial return motion of the worm shaft 14 the coupling engagement between the coupling bushing 26 and the double conical coupling ring 30 is interrupted and the coupling engagement between the latter and the setting ring 33 is restored. This return motion and the engagement is aided by the compression spring 34.

Phase (j)

There is a continuation of the return motion of the worm shaft 14 as far as the abutment face 16, the distance S3 then returning to its maximum value and furthermore owing to motion of the drive ring 35 away from the front end face 40 on the double conical ring 30 there is a return to the maximum play S1, which accompanied by simultaneous engagement of the conical coupling faces 31 and 32. Furthermore there is at the same time a slight turning of the worm shaft 14 in the direction of arrow B (FIG. 3), which means that there is a small decrease in the play.

Phase (k)

On further return motion of the linkage adjustment means 7 and after all the internally displaceable parts thereof have resumed their axial basic position, there is a further turning of the setting ring 33 owing to mouth 50 having previously come into engagement with the lower inner face 52 on the abutment pin 49, such turning continuing until the two abutments 55 and 56 are in engagement with each other. Owing to the engaged position of the double conical coupling ring 30 this turning of the setting ring 33 furthermore acts via the engaged threads 35 and 36 to cause a further turning of the worm shaft 14 in the direction of the arrow B (FIG. 3) and thus a turning of the worm wheel 11 in the direction of the arrow D (FIG. 3) with consequence of a further negative adjustment of the play between the brake drum 3 and the brake shoes 1 and 2.

Phase (l)

Further return pivoting of the linkage adjustment means 7, without changing of the position of its parts until the initial position is resumed. End of the braking operation. It will be apparent from this that an increase in the play by very small amounts between the brake drum 3 and the brake shoes 1 and 2 which is caused by wear, internal elasticity and, heating is taken into account by the linkage adjustment means 7 which provides a suitable amount of positive and negative adjustment. In the manner described the linkage adjustment means 7 uses its mechanism to sense a selfset rated or target value of the play between the brake drum 3 and the brake shoes 1 and 2 and owing to the positive or negative reset brought about prevents a seizing of the brake members (the shoes 1 and 2 and the brake drum 3) and overheating of the brake drum even when the brakes are used repeatedly in rapid succession.

This is in contact to the prior art in which linkage adjustment means so far proposed are based on the principle of a decrease in the play between the brake drum and the shoes.

A further advantage of the linkage adjustment means 7 of the invention is to be seen in the fact that the adjustment of the basic play between the brake drum 3 and the brake shoes 1 and 2 only has to be relatively approximate, because the linkage setting mechanism practically sets itself to the necessary rated play.

By way of completeness a discussion will now be presented of a setting procedure for the basic play as performed by hand. For this purpose a suitable tool, as for example an open-ended wrench, is applied to the setting head 45 of the worm shaft 14 to turn it. For adjustment the application of a torque of approximately 4 kpm is sufficient.

For increasing the play the worm shaft 14 is to be turned counterclockwise (in FIG. 4). This counterclockwise rotation acts via the engaged threads 35 and 36 to produce a disengagement of the double conical coupling ring 30 from the setting ring 33. After the friction here between the conical faces 31 and 32 and the action of the spring 20 has been overcome the worm shaft 14 is turned until the setting sleeve 43 comes to engage the front end face 40 of the double conical coupling ring 30. The distance S4 is thus reduced to zero. This means that the freewheel action of the double conical coupling ring 30 is overridden. A condition for this is that the distance S4 be smaller than the distance S3 and that the sum of the distances S2 and S4 be larger than the maximum distance S3. By further turning of the worm shaft 14 the worm wheel 11 and thus the cam 4 is then turned by way of the shaft to correspond to the desired play.

For subsequent clockwise turning of the worm shaft 14 in order to reduce the space it is then only necessary to overcome the friction, caused by the compression spring 20, between the abutment faces 16 and 18.

By way of conclusion it is to be pointed out that the mouth 50 and its function in connection with the stationary abutment pin 49 may be designed in a different manner to the illustrated example, for instance in accordance with FIG. 5 of the U.S. Pat. No. 3,351,163 or, respectively, the German examined specification No. 1,480,038, the mouth 50 than being separate from the setting ring 33 as a cutout in a disk mounted coaxially to the cam shaft 9 in a fixed manner in the linkage adjustment means 7 so that then the two side faces of this cutout form abutment faces (corresponding to 51 and 52) fixed to the linkage adjustment means, and in which case on the setting ring 33 there would be external teeth to mesh with the straight gear teeth of a setting rod. The setting rod, being mounted in the linkage adjustment means for axial motion, would be acted upon by the force of a return spring (corresponding to 57). The rod would have an entraining projection fitting into the mouth. The function of this mouth in connection with this setting rod as regards the setting of the released setting ring would in this case be the same as in the illustrated embodiment of the invention.

It is furthermore to be noted that the resetting function may also be performed even without the return spring 57 and without the abutments 55 and 56 as present on the linkage adjustment means, the effect then being that only the effects of the elastic deformation would not be overridden, but that however the additional new reset function would be at least partly compensate this so that nevertheless there would be no seizing of the parts to be braked.

The reset device in accordance with the invention is well suited to substantially improve commercial setting devices whose reset function has so far been limited, for which purpose a suitable modification is needed.

The resetting device in accordance with the invention is further able to be adapted to the modification of different designs of wheel brakes and the operating principles thereof by modification of individual parts of the device.

What is claimed is:

1. In a brake play resetting device for a braking mechanism in which an actuator moves an adjusting means during a braking operation to apply contact between brake linings and a member to be braked, and releases the adjusting means for return to its initial position after the braking operation is completed, the adjusting means having a setting shaft drivingly engaged with a drive wheel adapted to apply brake force to the brake linings, said setting shaft being axially displaceable between axially spaced abutments, unidirectional coupling means for rotating said setting shaft to reduce play between the linings and the member to be braked when said play exceeds a determined amount, and spring means acting on said shaft for yielding when a predetermined braking pressure is exceeded to permit displacement of the setting shaft between said abutments, the improvement wherein said unidirectional coupling means comprises a setting member displaceably supported by the adjusting means, abutment means positioned for being contacted by said setting member upon movement of the adjusting means during a braking operation, a turnable conical coupling member in driving engagement with said setting shaft and axially displaceable between a first position in coupled engagement with said setting member and a second position released from the setting member, and means for preventing turning of the coupling member during a part of the axial displacement movement of the setting shaft between said abutments to cause a relative slip of the driving engagement between the setting shaft and the coupling member and thus further to cause a small increase in the play between the brake linings and the member to be braked.

2. The device as claimed in claim 1 comprising threads with oblique flanks on said coupling member and said setting shaft to provide the driving engagement therebetween.

3. The device as claimed in claim 2 wherein said adjusting means comprises a pivotable housing in which said setting shaft is supported for said displacement between the abutments, said setting member being rotatable in said housing to effect said displaceable support, and undergoing rotation in said housing when said setting member is in contact with said abutment means and said adjusting means continues to move during a braking operation, said coupling member being in said first position in coupled engagement with said setting member as said adjusting means continues to move during a braking operation so that the rotation of said setting member produces rotation of the setting shaft via said coupling member and said threads on the coupling member and setting shaft.

4. The device as claimed in claim 3 wherein said spring means comprises an axial compression spring acting between said setting shaft and said housing.

5. The device as claimed in claim 3 wherein said drive wheel comprises a worm wheel and said setting shaft includes a worm in driving engagement with said worm wheel.

6. The device as claimed in claim 4 wherein said spring means comprises an axial compression spring acting between said setting shaft and said housing for normally urging said worm against one abutment such that upon application of a braking force above a determined value, the setting shaft and worm are moved by said force against the action of the axial compression spring towards the other abutment.

7. The device as claimed in claim 3 wherein said setting member has an open mouth with spaced abutment surfaces, said abutment means being disposed within said mouth.

8. The device as claimed in claim 7 wherein said coupling member has two conical surfaces, one in engagement with said setting member in said first position of the coupling member, the other in fixed engagement with said housing in said second position of the coupling member.

9. The device as claimed in claim 8 comprising means holding the setting member in fixed axial position in the housing while permitting rotation of the setting member in the housing.

10. The device as claimed in claim 9 wherein said setting member is rotatable in said housing by cooperation between said mouth and the abutment means disposed therein and forming part of the unidirectional coupling means, said coupling member comprising a coupling ring in engagement, via said threads to produce disengagement of the connection of the setting member and the setting shaft such that when the adjusting means is pivoted in either of two directions during a braking operation, there is produced, by virtue of interaction of the conical coupling ring and axial displacement and turning of the worm shaft and turning of the setting member, an alteration in the play between the member to be braked and the brake linings by a positive or negative amount an oscillating manner about an automatically set rated value.

11. The device as claimed in claim 10 wherein said setting member includes spaced drive fingers defining said mouth and having inner faces on two sides of said mouth which constitute said abutment surfaces.

12. The device as claimed in claim 11 comprising bearing balls rotatably supporting said setting ring in a circular groove of which one half is formed in the setting ring and the other half is formed in said housing.

13. The device as claimed in claim 10 wherein said means for presenting turning of said coupling member comprises a coupling bushing having a bore fixedly anchored in said housing, said coupling member in said second position engaging said coupling bushing, said bore rotatably receiving said worm shaft, said coupling bushing having an end to face constitution one of said abutments against which an end face of the setting shaft is urged by the compression spring.

14. The device as claimed in claim 13 comprising a second compression spring acting between the coupling bushing and the conical coupling ring to urge the threads on the conical coupling ring against the threads on the worm and to urge the conical coupling ring to bear against the setting ring.

15. The device as claimed in claim 14 comprising a further compression spring acting axially the worm shaft adjacent to said threads, the thrust of said further spring being less than that of the second compression spring, and a drive ring on said shaft against which said further compression spring bears.

16. The device as claimed in claim 15 wherein said drive ring is fixed to said shaft in spaced relation with said conical coupling ring by an amount such that when the conical coupling ring is engaged with the setting ring, the coupling ring is at a minimum spacing from said drive ring.

* * * * *